(12) United States Patent
Cheloha et al.

(10) Patent No.: US 10,554,586 B2
(45) Date of Patent: Feb. 4, 2020

(54) PHYSICAL PORT IDENTIFICATION USING SOFTWARE CONTROLLED LEDS

(71) Applicant: INTERNATIONAL BUSINESS MACHINES CORPORATION, Armonk, NY (US)

(72) Inventors: Scott Cheloha, Austin, TX (US); Utsav Lokinindi, Austin, TX (US); Irving Olmedo, Austin, TX (US); Kara Schrader, Sandy Shores, TX (US); Juan P. Villamizar, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 175 days.

(21) Appl. No.: 15/439,028

(22) Filed: Feb. 22, 2017

(65) Prior Publication Data
US 2018/0241697 A1 Aug. 23, 2018

(51) Int. Cl.
*H04L 12/931* (2013.01)
*H04L 12/46* (2006.01)

(52) U.S. Cl.
CPC .................... *H04L 49/40* (2013.01)

(58) Field of Classification Search
CPC ............................ H04L 12/4641; H04L 49/40
See application file for complete search history.

(56) References Cited

U.S. PATENT DOCUMENTS

| | | | |
|---|---|---|---|
| 5,717,570 A * | 2/1998 | Kikinis | G06F 1/181 312/223.2 |
| 8,737,416 B2 | 5/2014 | Kuo et al. | |
| 9,265,112 B2 | 2/2016 | Pederson | |
| 9,384,113 B1 | 7/2016 | Moy et al. | |
| 9,407,510 B2 | 8/2016 | Thompson | |
| 2002/0113714 A1 | 8/2002 | Lopez | |
| 2003/0018756 A1* | 1/2003 | Nguyen | G06F 11/2005 709/220 |
| 2005/0246436 A1 | 11/2005 | Day et al. | |
| 2007/0103857 A1* | 5/2007 | Weech | G06F 1/181 361/679.34 |
| 2009/0219831 A1* | 9/2009 | Shaker | H04L 29/12028 370/254 |
| 2009/0271786 A1* | 10/2009 | Groth | G06F 9/5077 718/1 |
| 2011/0110241 A1 | 5/2011 | Atkinson et al. | |
| 2012/0084071 A1* | 4/2012 | Cyr | G06F 11/0712 703/25 |

(Continued)

*Primary Examiner* — Edan Orgad
*Assistant Examiner* — Nourali Mansoury
(74) *Attorney, Agent, or Firm* — Cantor Colburn LLP

(57) ABSTRACT

A computer-implemented method for identifying a physical port associated with a virtual machine is provided. The method includes receiving a request to identify the physical port associated with the virtual machine. The method also includes translating, by a processor, an address of a virtual interface of the virtual machine into an address of a physical interface, the address of the physical interface including slot identification and port identification of the physical port. The method further includes identifying a plurality of light emitting diodes (LEDs) that correspond to the address of the physical interface and instructing a LED controller to activate the plurality of LEDs.

20 Claims, 4 Drawing Sheets

(56) References Cited

U.S. PATENT DOCUMENTS

| | | | |
|---|---|---|---|
| 2012/0236761 A1* | 9/2012 | Yang | H04L 61/103 370/259 |
| 2013/0148511 A1 | 6/2013 | Banga et al. | |
| 2013/0219384 A1* | 8/2013 | Srinivasan | G06F 9/45558 718/1 |
| 2014/0218199 A1* | 8/2014 | Cepulis | H04L 41/24 340/635 |
| 2016/0331993 A1* | 11/2016 | Moyer | A61N 5/0616 |

\* cited by examiner

PHYSICAL PORT IDENTIFICATION USING SOFTWARE CONTROLLED LEDS

BACKGROUND

The present disclosure relates to the field of port identification for virtual machines, and more specifically, to physical port identification for a virtual machine using software controlled light emitting diodes (LEDs).

Determining which physical port a virtual interface corresponds to on a modern, fully virtualized operating system is difficult because the operating system never communicates directly with the physical port. Instead, a device driver of the virtual machine communicates with a device implemented in software and provisioned by a hypervisor, or virtual machine manager. This configuration presents challenges when a system administrator needs to service the physical port for a given virtual interface because the operating system of the virtual machine is not aware of the underlying physical interface. Accordingly, to identify a physical port for a virtual machine, the administrator must locate a port mapping in the hypervisor.

Therefore, heretofore unaddressed needs still exist in the art to address the aforementioned deficiencies and inadequacies.

SUMMARY

According to one embodiment, a computer-implemented method for identifying a physical port associated with a virtual machine is provided. The method includes receiving a request to identify the physical port associated with the virtual machine. The method also includes translating, by a processor, an address of a virtual interface of the virtual machine into an address of a physical interface, the address of the physical interface including a slot identification and a port identification of the physical port. The method further includes identifying a plurality of light emitting diodes (LEDs) that correspond to the address of the physical interface and instructing a LED controller to activate the plurality of LEDs.

According to another embodiment, a computer program product for identifying a physical port associated with a virtual machine, the computer program product comprising a computer readable storage medium having program instructions embodied therewith is provided. The program instructions executable by a processor to cause the processor to receive a request to identify the physical port associated with the virtual machine and to translate, by a processor, an address of a virtual interface of the virtual machine into an address of an physical interface, the address of the physical interface including a slot identification and a port identification of the physical port. The program instructions further cause the processor to identify a plurality of light emitting diodes (LEDs) that correspond to the address of the physical interface and instruct a LED controller to activate the plurality of LEDs.

According to a further embodiment, a system for identifying a physical port associated with a virtual machine is provided. The system includes a processing system disposed within an enclosure, the processing system having one or more of hardware expansion slots that include communications devices, wherein the enclosure includes a plurality of light emitting diodes disposed of the enclosure adjacent to the hardware expansion slots. The processing system including a processor configured to receive a request to identify the physical port associated with the virtual machine, translate an address of a virtual interface of the virtual machine into an address of an physical interface, the address of the physical interface including a slot identification and a port identification of the physical port, identify one or more of the plurality of light emitting diodes (LEDs) that correspond to the address of the physical interface and instruct an LED controller to activate the one or more of plurality of LEDs.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments include methods, systems, and computer program products for identifying a physical port associated with a virtual machine. In an exemplary embodiment, a server rack or other enclosure includes a plurality of light emitting diodes (LEDs) that are arranged around one or more slots in which communications devices are disposed of. The enclosure includes a processing system that hosts one or more virtual machines, such as a hypervisor. The enclosure also includes a LED controller that is in communication with the processing system, the LED controller is configured to selectively activate one or more of the plurality of LEDs.

In exemplary embodiments, the hypervisor, also referred to herein as the virtual machine manager, receives a request to identify the physical ports that a virtual machine is utilizing. In response to the request, the virtual machine manager translates an address of a virtual interface of the virtual machine into an address of a physical interface. The address of the physical interface is the provided to the LED controller which activates the LEDs adjacent to one or more communication ports on the communications devices that are being utilized by the virtual machine.

In exemplary embodiments, by attaching a set of LEDs to the back of a server rack, or other enclosure, a visible link between a virtual interface and a physical port can be created. In one embodiment, the LEDs can be managed by a stand-alone controller that through its driver can light up an LED corresponding to a virtual interface. In exemplary embodiments, a group of LEDs across multiple servers can be managed by a single processing system, which will have the flexibility to cover identification of physical ports, individual servers, and server racks.

Figure 1:
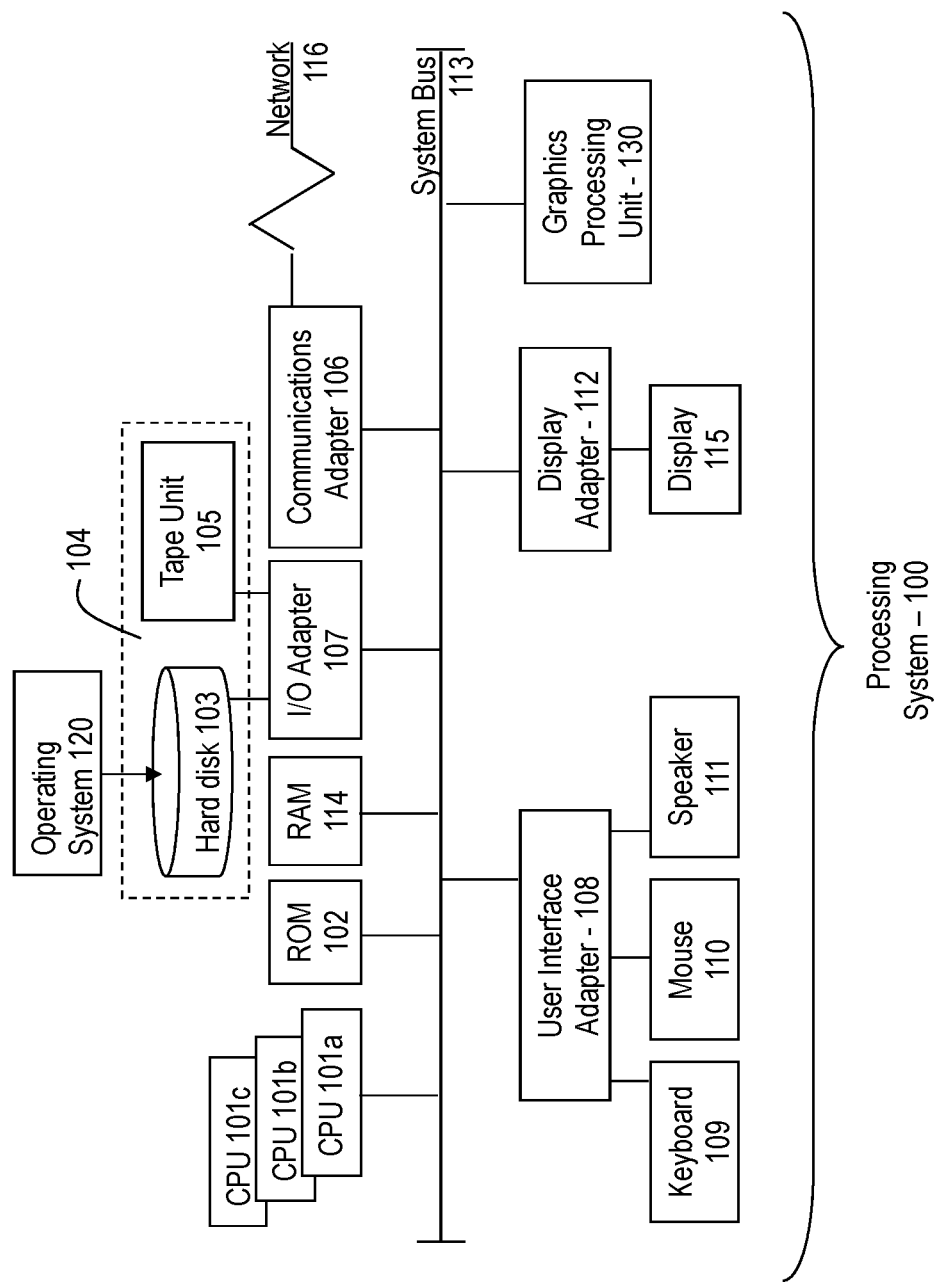
FIG. 1 illustrates a block diagram of a processing system for implementing some or all aspects of the system and method in accordance with one or more embodiments.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 1.

Figure 2:
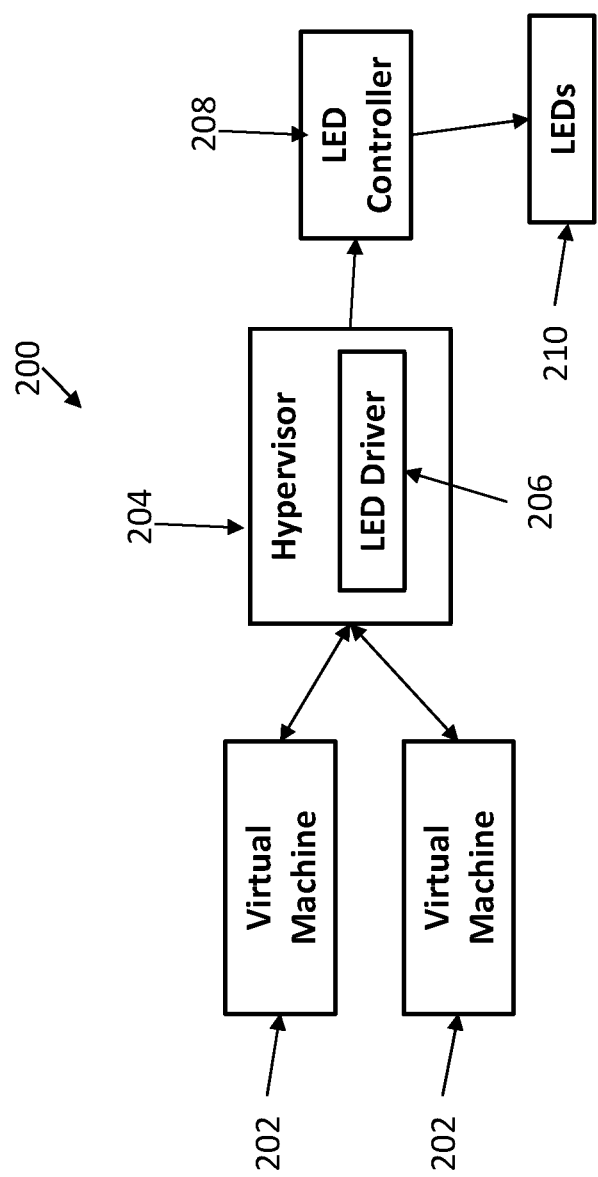
FIG. 2 is a block diagram of a system for identifying a physical port associated with a virtual machine in accordance with an embodiment.

Referring now to FIG. 2, a block diagram of a system 200 for identifying a physical port associated with a virtual machine in accordance with an embodiment of the disclosure is shown. As illustrated, the system 200 includes one or more virtual machines 202 that are in communication with a hypervisor 204. In one embodiment, the hypervisor 204 can be embodied in a processing system similar to the one shown in FIG. 1. In various embodiments, the virtual machines 202 and the hypervisor 204 can be disposed on a single processing system or on different processing systems. The hypervisor 204 includes a LED driver 206 that is configured to look up an address of physical interface based on a virtual interface address. In addition, the LED driver 206 can translate the physical interface address into a set of LED lights to enable. The LED driver 206 is in communication with an LED controller 208 and can transmit instructions to the LED controller 208 to enable one or more LEDs 210. The LED controller 208 is configured to activate one or more LEDs 210 based on the instructions received from the LED controller 208.

Figure 3:
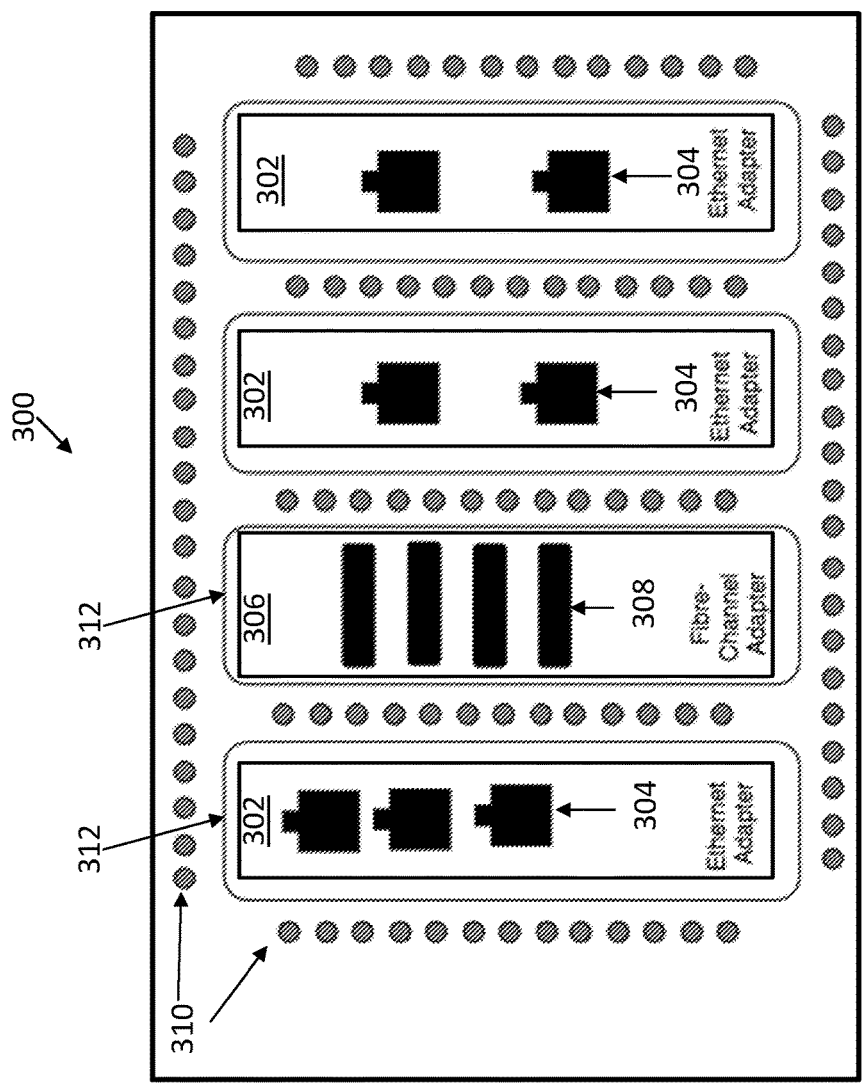
FIG. 3 is a schematic illustrating an enclosure that includes a processing system for identifying a physical port associated with a virtual in accordance with an embodiment.

Referring now to FIG. 3, a schematic illustrating an enclosure 300 that includes a processing system for identifying a physical port associated with a virtual interface in accordance with an embodiment is shown. As illustrated, the enclosure 300 includes a plurality of hardware expansion slots 312 that each contains a communications device 302, 306. Each of the communications devices 302, 306 include one or more communications ports 304, 308. The enclosure 300 also includes a plurality of LEDs 310 that are disposed on around the hardware expansion slots 312. In exemplary embodiments, the plurality of LEDs 310 includes LEDs that are disposed on all four sides of the hardware expansion slots 312. The number and size of the LEDs 310 can be determined based on the size and type of the enclosure 300, the communications expansion slots 312 and the like. The communications devices 302, 306 can include one or more of an Ethernet adapter and a fibre-channel adapter.

For example, that various configurations of communications ports 304, 308 can be handled by increasing the granularity of LEDs per port. In exemplary embodiments, the LEDs can be used to identify physical locations of 2,3, or 4-port cards. In exemplary embodiments, the LEDs adjacent to a port can be illuminated to identify the port as corresponding to an identified virtual machine. The illuminated LEDs 310 can include the LEDs 310 disposed adjacent to the port 304, 308, i.e., any of the LEDs that overlap the port 304, 308. In one embodiment, the LEDs disposed on both sides of the port 304, 308 are illuminated in addition to the LEDs disposed above and below the hardware expansion slots 312 in which the port 304, 308 is located.

In exemplary embodiments, the LED controller is configured such that it can simultaneously illuminate multiple LEDs to identify a single port 304, 308 or multiple ports 304, 308 at once. In one embodiment, the LED controller can illuminate different LEDs in different colors or using different flashing/pulsing patterns to indicate different ports. For example, if a virtual interface maps to two separate physical ports with one being a primary port and the other serving as a backup, the LED controller can be used to illuminate the LEDs for the two ports in different manners, such as with different colors or flashing patterns.

In one embodiment, an operator of a virtual machine or a hypervisor can use a program that is configured to receive requests for identification of a physical port associated with a virtual interface. The program communicates with an LED-driver disposed on the hypervisor which translates the virtual interface to a physical location. The program then communicates with an LED controller that electrically drives the set of LEDs identified by the LED-driver. In exemplary embodiments, the request to identify the physical ports can include a desired duration that the LEDs should remain active. The desired duration, if provided, can override a default duration that is stored by the LED controller.

Figure 4:
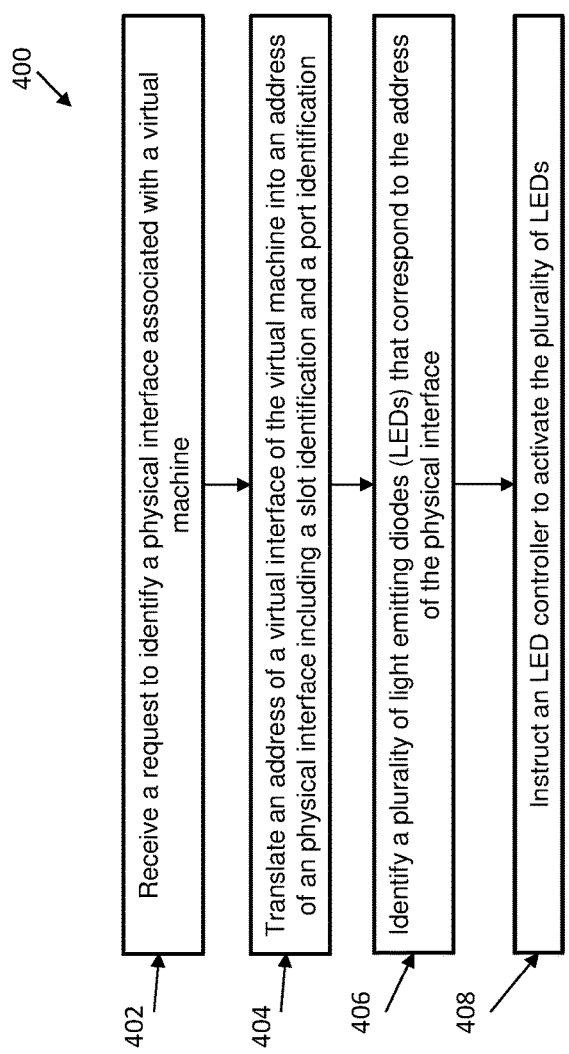
FIG. 4 is a flow chart illustrating a method for identifying a physical port associated with a virtual machine in accordance with an embodiment.

Referring now to FIG. 4, a flow chart illustrating a method 400 for identifying a physical port associated with a virtual machine in accordance with an embodiment is shown. As illustrated at block 402, the method 400 includes receiving a request to identify a physical interface associated with a virtual machine. In exemplary embodiments, the request can be received from a user of a virtual machine, an administrator of a hypervisor that manages the virtual machine, or from another source. Next, as shown at block 404, the method 400 includes translating an address of a virtual interface of the virtual machine into an address of a physical interface. In exemplary embodiments, a virtual interface can be translated into more than one physical address. For example, a virtual network interface of a virtual machine can use two different physical ports to improve the performance or to provide redundancy or a guaranteed quality of service.

In exemplary embodiments, the address of the virtual interface of the virtual machine is translated into the address of the physical interface by an LED driver that maintains a look-up table which correlates virtual interface addresses with physical interface addresses. In exemplary embodiments, the address of a physical interface includes both an identification of a slot that the communications device is located at and an identification of the port on the communications device that the physical interface is using. Next, as shown at block 406, the method 400 includes identifying a plurality of LEDs that correspond to the address of the physical interface. In exemplary embodiments, the LED driver includes a mapping of the LEDs that correspond to the address of each of the physical interfaces. The method 400 also includes instructing an LED controller to activate the plurality of LEDs, as shown at block 408.

In another embodiment, multiple virtual interfaces can be mapped to a single physical port. In such cases, the translation of the virtual interface address includes locating the one physical port regardless of which virtual interface calls for location.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises of one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method identifying a physical port associated with a virtual machine, the method comprising:
   receiving a request to identify the physical port associated with the virtual machine;
   translating, by a processor, an address of a virtual interface of the virtual machine into an address of a physical interface, the address of the physical interface including a slot identification and a port identification of the physical port;
   identifying a plurality of light emitting diodes (LEDs) that correspond to the address of the physical interface; and
   instructing an LED controller to activate the plurality of LEDs, wherein the plurality of LEDs are located on an enclosure, proximate to hardware expansion slots and activating the plurality of LEDs indicate physical locations of expansion cards and physical ports.

2. The method of claim 1, wherein the plurality of light emitting diodes are disposed on an enclosure containing the physical interface.

3. The method of claim 2, wherein the enclosure includes one or more arrays of light emitting diodes are disposed on an outer surface of the enclosure proximate to and on opposing sides of the hardware expansion slots that are configured to receive communication devices.

4. The method of claim 3, wherein the hardware expansion slots include at least one peripheral component interconnect express slot and the communication devices include one of an Ethernet adapter and a fibre-channel adapter.

5. The method of claim 1, wherein the plurality of LEDs that correspond to the address of the physical interface comprise two or more LEDs disposed adjacent to and on opposing sides of the physical port.

6. The method of claim 1, wherein the address of the physical interface includes the slot identification and the port identification of the physical port and a second physical port.

7. The method of claim 6, wherein the instruction to activate the plurality of LEDs instructs the LED controller to activate LEDs that correspond to both of the physical port and the second physical port simultaneously.

8. A computer program product for identifying a physical port associated with a virtual machine, the computer program product comprising a non-transitory computer readable storage medium having program instructions embodied therewith, the program instructions executable by a processor to cause the processor to perform:
   receiving a request to identify the physical port associated with the virtual machine;
   translating, by a processor, an address of a virtual interface of the virtual machine into an address of a physical interface, the address of the physical interface including a slot identification and a port identification of the physical port;
   identifying a plurality of light emitting diodes (LEDs) that correspond to the address of the physical interface; and
   instructing an LED controller to activate the plurality of LEDs, wherein the plurality of LEDs are located on an enclosure, proximate to hardware expansion slots and activating the plurality of LEDs indicate physical locations of expansion cards and physical ports.

9. The computer program product of claim 8, wherein the plurality of light emitting diodes are disposed on the enclosure containing the physical interface.

10. The computer program product of claim 9, wherein the enclosure includes one or more arrays of light emitting diodes are disposed on an outer surface of the enclosure proximate to and on opposing sides of the hardware expansion slots that are configured to receive communication devices.

11. The computer program product of claim 10, wherein the hardware expansion slots include at least one peripheral component interconnect express slot and the communication devices include one of an Ethernet adapter and a fibre-channel adapter.

12. The computer program product of claim 8, wherein the plurality of LEDs that correspond to the address of the physical interface comprise two or more LEDs disposed adjacent to and on opposing sides of the physical port.

13. The computer program product of claim 8, wherein the address of the physical interface includes the slot identification and the port identification of the physical port and a second physical port.

14. The computer program product of claim 13, wherein the instruction to activate the plurality of LEDs instructs the LED controller to activate LEDs that correspond to both of the physical port and a second physical port simultaneously.

15. A system for identifying a physical port associated with a virtual machine, the system comprising:
   a processing system disposed within an enclosure, the processing system having one or more of hardware expansion slots that include communication devices, wherein the enclosure includes a plurality of light emitting diodes disposed on the enclosure adjacent to the hardware expansion slots, the processing system including a processor configured to:
   receive a request to identify the physical port associated with the virtual machine;
   translate an address of a virtual interface of the virtual machine into an address of a physical interface, the address of the physical interface including a slot identification and a port identification of the physical port;
identify one or more of the plurality of light emitting diodes (LEDs) that correspond to the address of the physical interface; and
instructing an LED controller to activate the plurality of LEDs, wherein the plurality of LEDs are located on the enclosure, proximate to the hardware expansion slots and activating the plurality of LEDs indicate physical locations of expansion cards and physical ports.

16. The system of claim 15, wherein the one or more hardware expansion slots include at least one peripheral component interconnect express slots.

17. The system of claim 15, wherein the communication devices comprise one of an Ethernet adapter and a fibre-channel adapter.

18. The system of claim 15, wherein the address of the physical interface includes the slot identification and the port identification of the physical port and a second physical port.

19. The system of claim 18, wherein the instruction to activate the plurality of LEDs instructs the LED controller to activate LEDs that correspond to both of the physical port and a second physical port simultaneously.

20. The system of claim 15, wherein the plurality of LEDs that correspond to the address of the physical interface comprise two or more LEDs disposed adjacent to and on opposing sides of the physical port.

\* \* \* \* \*